United States Patent
Dando et al.

(10) Patent No.: US 12,409,618 B2
(45) Date of Patent: Sep. 9, 2025

(54) METHOD OF FORMING COMPOSITES BY JOULE HEATING OF ENVELOPING METALLIC SHEETS

(71) Applicant: Spirit AeroSystems, Inc., Wichita, KS (US)

(72) Inventors: Kerrick Dando, Wichita, KS (US); Rahbar Nasserrafi, Wichita, KS (US); Mark Anthony Wadsworth, Wichita, KS (US); Gerald Hicks, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 107 days.

(21) Appl. No.: 18/119,205

(22) Filed: Mar. 8, 2023

(65) Prior Publication Data
US 2024/0300195 A1    Sep. 12, 2024

(51) Int. Cl.
*B29C 70/44*    (2006.01)
*B29C 70/54*    (2006.01)

(52) U.S. Cl.
CPC .......... *B29C 70/544* (2021.05); *B29C 70/44* (2013.01); *B29C 70/545* (2013.01)

(58) Field of Classification Search
CPC ....... B29C 70/544; B29C 70/44; B29C 53/04; B21D 22/22; B21D 26/021; B21D 35/007
See application file for complete search history.

(56) References Cited

U.S. PATENT DOCUMENTS 2,789,204 A    4/1957    Kilpatrick et al.
3,737,978 A *  6/1973    Rathbun .............. B23K 1/0014
                                                            228/221
(Continued)

FOREIGN PATENT DOCUMENTS

EP       3915750 A1    12/2021
FR       2090436 A6     1/1972
WO    20020155582 A1    7/2022

OTHER PUBLICATIONS

European Search Report and Written Opinion, Europe Patent Application No. 24162106.9, dated Jul. 8, 2024, 12 pages, European Patent Office, Munich, Germany.

*Primary Examiner* — Yunju Kim
(74) *Attorney, Agent, or Firm* — Stinson LLP

(57) ABSTRACT

A method of manufacturing a complex-shaped composite part, including the steps of applying a metallic sheath around a composite laminate workpiece and applying an electric current through the metallic sheath to heat the workpiece. The metallic sheath may be sealed around the composite laminate workpiece, with air or atmosphere evacuated therefrom. The method also includes shaping the workpiece in the metallic sheath into a complex-shaped composite part while it is being heated. The shaping can be performed between two ceramic dies or using other techniques for forming complex shapes and curvatures into the workpiece. The method then may include cooling the complex-shaped composite part and removing the metallic sheath from the complex-shaped composite part. This method minimizes cycle times and reduces breakage of fiber reinforcement of the composite laminate. The method also helps avoid tearing, buckling, or wrinkling of the workpiece during formation via the structural support provided.

19 Claims, 9 Drawing Sheets

(56) References Cited

U.S. PATENT DOCUMENTS

| | | | |
|---|---|---|---|
| 4,657,717 | A | 4/1987 | Cattanach et al. |
| 5,344,602 | A | 9/1994 | Yencho |
| 5,530,227 | A | 6/1996 | Matsen et al. |
| 5,705,794 | A | 1/1998 | Gillespie |
| 5,728,309 | A | 3/1998 | Matsen et al. |
| 6,463,779 | B1 | 10/2002 | Terziakin |
| 7,669,452 | B2 | 3/2010 | Polen et al. |
| 2005/0242087 | A1 | 11/2005 | Anderson et al. |
| 2009/0139642 | A1 | 6/2009 | Enneking et al. |
| 2014/0083155 | A1 | 3/2014 | Matsen et al. |
| 2019/0134863 | A1 | 5/2019 | Matsen et al. |
| 2020/0331214 | A1* | 10/2020 | Vlavianos ............... B29C 51/36 |
| 2021/0276280 | A1 | 9/2021 | Sauer et al. |
| 2022/0153463 | A1* | 5/2022 | Beck ....................... B65B 47/08 |

* cited by examiner

METHOD OF FORMING COMPOSITES BY JOULE HEATING OF ENVELOPING METALLIC SHEETS

BACKGROUND

Thermoplastic and thermoset composite parts are often used in the aircraft industry for structural aircraft parts. However, conventional and advanced materials used for aerospace, propulsion and hypersonic applications have various shortcomings.

For example, current limitations in stamp forming of thermoplastic composites prevents the forming of large, complex components. This is primarily due to the fact that there are issues with uniformly heating blanks (e.g., the uncured composite laminate), transferring them from an oven to a press and under pressure within just a few short seconds and accurately locating the blanks' unique features to matched metal tooling. Generally, edges of the composite laminates cool quicker than interior regions thereof, reducing the ability for the composite laminates' plies to slip with respect to one another during the forming process.

Thus, the technology described herein addresses current shortcoming of forming and treating techniques used for composite part forming.

SUMMARY

The present invention solves the above-described problems and provides a distinct advance in the art of manufacturing composite parts. Specifically, some embodiments of the present invention include a method of manufacturing a complex-shaped composite part and may comprise a step of applying a metallic sheath to around at least two opposing surfaces of a workpiece. The workpiece can be a thermoplastic or thermoset composite laminate. The method may also include the steps of applying an electric current through the workpiece in the metallic sheath to heat the workpiece and shaping the workpiece in the metallic sheath into a complex-shaped composite part. Furthermore, the method may include cooling the complex-shaped composite part.

In accordance with another embodiment, a method of manufacturing a complex-shaped composite part includes a step of enclosing a workpiece within a metallic sheath. For example, the workpiece is a fiber reinforced thermoplastic or thermoset composite laminate, and the metallic sheath is a sacrificial metal. The method may also include the steps of evacuating atmosphere through an opening in the metallic sheath via vacuum. Furthermore, the method may include the steps of applying an electric current through the metallic sheath to heat the workpiece and shaping the workpiece in the metallic sheath into a complex-shaped composite part, including pressing the workpiece in the metallic sheath against at least one non-conductive tooling surface (e.g., a ceramic tooling surface). The method can also include cooling the complex-shaped composite part.

In yet another embodiment, a system for manufacturing a complex-shaped composite part includes a metallic sheath, a workpiece sandwiched between at least two sheets of the metallic sheath, at least one non-conductive tooling having a non-conductive tooling surface shaped with one or more complex curvatures, and at least two electrical contacts or leads contacting the metallic sheath and configured for applying electrical current through the metallic sheath for joule heating or resistance heating the workpiece. The system may also include workpiece tension control components located at opposing ends of the non-conductive tooling surface, engaging opposing edge portions of the metallic sheath, and actuatable in opposite directions, enabling draping of the metallic sheath and the workpiece toward the non-conductive tooling surface while the two electrical contacts or leads apply electrical current therethrough.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in more detail below with reference to the attached drawing figures, wherein.

Figure 1A:
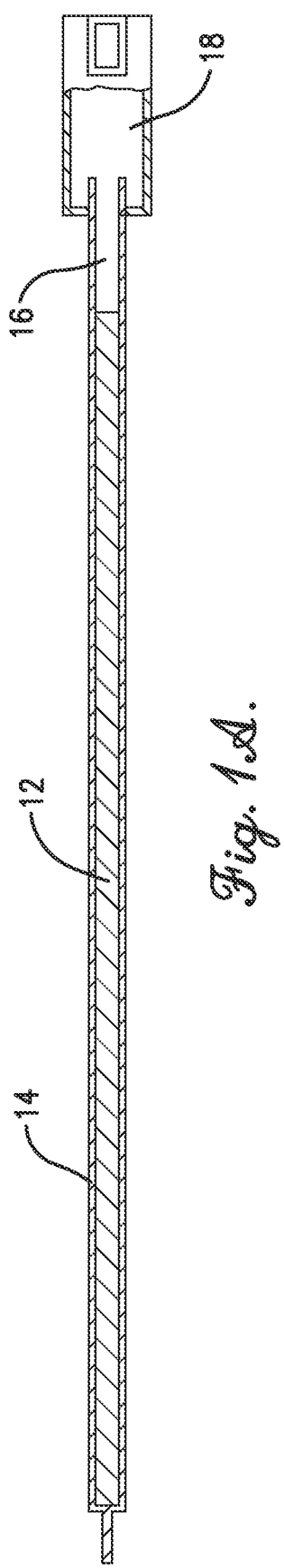
FIG. 1a is a side cross-sectional view of a composite laminate workpiece within a metallic sheath, in accordance with embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized, and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the present technology can include a variety of combinations and/or integrations of the embodiments described herein.

The present invention solves the above-described prior art problems and provides a distinct advance in the art of manufacturing thermoplastic or thermoset composite parts. In some embodiments, to address various disadvantages in prior art methods of shaping composite laminate workpieces into complex-shaped composite parts, the present invention provides an improved method for manufacturing such complex-shaped parts for use on aircrafts and various aerospace structures. Specifically, applicant discovered various advantages to applying electric current directly into a metallic sheath surrounding or at least partially surrounding a composite laminate. This electric current is applied while forming the sheet metal of the metallic sheath into complex configurations in accordance with methods herein. This advantageously results in minimized cycle times and reduced breakage of fiber reinforcement of the composite laminate workpiece. Specifically, the metallic sheath can structurally support fiber reinforced composite on both an inner mold line (IML) and an outer mold line (OML) and can even allow the composite laminate to be drawn or draped into a die cavity at least partially before being fully formed and consolidated or cured into the final shape, which can assist in limiting undesired stretching or wrinkles during part formation. That is, the metallic sheath can structurally support the composite laminate described herein and can be stretched to eliminate tendency for wrinkling or buckling of the composite plies/composite laminate. The various systems and methods described herein can also advantageously rapidly form and consolidate extremely large composite parts.

Surrounding or partially surrounding the composite laminate workpiece with the metallic sheath can involve the workpiece being sandwiched between two sheets of metal and/or, in some embodiments, can include welding or otherwise sealing the two sheets of metal together to fully enclose the workpiece therebetween. This allows for the workpiece to be pre-aligned to its forming tool (e.g., dies), heated within die sets, and when used in concert with electrically insulative tooling (e.g., ceramic dies), the current can be applied throughout the forming process to prevent cold spots on the composite laminate that can lead to wrinkle or defect formation. By preventing these cold spots, this invention can also remove the need for the use of self-heated tools. Using the methods herein, temperature can be modulated quickly, with faster cycle times compared to traditional processes that rely on heating and achieving equilibrium temperature in high-thermal mass tooling.

In some embodiments, the methods described herein can be used in a traditional stamp forming process to heat the workpiece (e.g., composite laminate), with power being turned off before forming to allow for the use of electrically conductive tooling materials (e.g., steel). However, non-conductive tooling such as ceramic is used in other embodiments as described herein. Reconfigurable tooling can also be utilized to quickly change between part designs without additional tooling, and in concert with the fast temperature modulation of the joule heating process, can allow for quick changing of recipes. This process enables stretch forming of composite structures, minimizing wrinkle formation through tensioning the periphery of the composite laminate being formed. The metallic sheets used to heat the composite laminates can be machined/chemically etched to match thickness variations present in the composite laminate surface (e.g., if pad-ups or the like are present). Alternatively, materials of different conductivities can be added to one or more portions of the metallic sheath's surface (cold spray, selective electroplating, 3-D printing, or the like) to account for the heating variations that could arise in a variable thickness and resistance joule heated metallic sheath.

Generally, systems and methods for manufacturing complex-shaped composite parts are disclosed herein for various uses, such as aircraft components, structures, or the like. For example, the systems and methods described herein can be used for making high-performance aerospace fiber reinforced polymeric composites at elevated temperatures outside of an autoclave. The workpiece herein is surrounded or at least partially surrounded by a metallic sheath. For example, the workpiece can be sandwiched between two sheets of metal or surrounded by a metal envelope. In one example embodiment, the workpiece is encased by encapsulation into a vacuum sealed metallic sheath. The metallic sheath is made of sacrificial metallic cover sheets or sacrificial metallic plates which may sandwich the workpiece therebetween and may be unattached or alternatively sealed to each other via welding or the like. The workpiece covered or encased in the metallic sheath may be subsequently resistance heated or joule heated by application of an electric current (e.g., pulsed or continuous electrical direct current or alternating current) and then pressed into desired shapes using ceramic dies (e.g., die cavity with permanent or re-configurable ceramic material) or other shaping techniques known in the art. For example, forming stresses can be applied by various methods such as using match dies (e.g., stamp forming) alone or in combination with application of differential pressure (e.g., vacuum bagging of the composite laminate). Other forming tools can include one- or two-sided reconfigurable dies with ceramic tips or stretch forming equipment. Upon completion of forming/shaping, the resulting formed part may be trimmed, and the sacrificial cover/metallic sheath may be removed. The formed part, as described herein, may be a complex-shaped composite part or a formed composite part having simple shapes or curvatures formed therein. Following removal of the formed part from the metallic sheath, the formed part may be inspected and processed further (e.g., holes drilled), machined, coated with thermal barrier coating, and/or assembled into a desired structure.

FIGS. 1a-9b disclose various components and tooling of a system 10 for manufacturing a formed part in accordance with embodiments herein. FIGS. 1a and 1b depict a workpiece 12 surrounded by a metallic sheath 14 forming a chamber around the workpiece 12, and tool 20 configured or configurable as depicted in various embodiments herein for shaping the workpiece 12 and the metallic sheath 14.

In some embodiments, the workpiece 12 may be a fiber reinforced thermoplastic or thermoset composite laminate. The composite laminate can include a plurality of plies (e.g., semi-crystalline or amorphous thermoplastic or thermoset composite plies) stacked together to form an uncured panel or laminate which then is heated and consolidated to form a final composite part. In some embodiments, the workpiece 12 includes a reinforcement fiber and a matrix (e.g., a thermoplastic matrix resin). For example, the matrix or thermoplastic matrix resin can be one or more of: polyaryletherketone (PAEK), polyetherketoneketone (PEKK), polyetheretherketone (PEEK), polyphenylene sulfide (PPS), Polyethylenimine (PEI), and the like. The workpiece 12 is generally drapable and formable when heated to a forming temperature and/or melting temperature of the matrix thereof, allowing it to be formed into a variety of shapes via the methods described herein during forming and/or curing. The forming temperature is dependent on a melting point of the matrix or resin. The workpiece 12 may have any size, shape, and/or number of terminal edges without departing from the scope of the technology described herein.

The metallic sheath 14 may be an electrically conductive, low-cost sacrificial metal, such as sacrificial interface sheets made of mild steels, stainless steel, or nickel base alloys. The metallic sheath 14 may be formed to surround or at least partially surround the workpiece 12. For example, partially surrounding the workpiece 12 can include, for example, a metallic sheath having two separate sheets of metal sandwiching the workpiece 12 therebetween. In some embodiments, the metallic sheath comprises sheet metal including one or more of: cobalt base alloys, nickel base alloys, heat resistant and corrosion resistant steels, Maraging steels, ultrahigh strength steels, stainless steel, aluminum, titanium alloys, and extreme temperature refractory alloys. Other sacrificial metals can be used without departing from the scope of the invention.

The metallic sheath 14 described herein may be made out of a metal that remains solid while pliable at relatively low pressures. In some embodiments, the metallic sheath 14 may be made of metal with a melting point of at least 800 degrees F. In one example embodiment, the metallic sheath 14 is made from mild steel. In some embodiments, the metallic sheath 14 has a high electrical resistance to keep voltages high (lower current). Some example metals for the metallic sheath 14 can include 6AL4V Ti, Inconel, 316 stainless steel, 304 stainless steel, and the like. In some embodiments, the metallic sheath 14 is made of a metal with a melting temperature in a range of 2,500° F. to 3,200° F. In other embodiments, the metallic sheath 14 is made of a metal with a melting temperature in a range of 800° F. to 3,200° F. In general, the minimum melting point of the metallic sheath 14 is at least above the melting temperature of the matrix of the workpiece 12 (e.g., composite laminate) described herein, which may be in a range of 500° F. to 800° F. in some embodiments. For example, the glass transition temperature and the melting temperature for polymer matrix composites are typically well below melting temperature of steel or aluminum cover sheets. The metallic sheath 14 described herein can be coated to prevent bonding to resin of the composite laminate workpiece 12.

The metallic sheath 14 can be two metal or metallic sheets sandwiching the workpiece 12 therebetween and/or the two or more separate metal or metallic sheets can be welded to fully encapsulate the workpiece 12. For example, the metallic sheets can be sealed together if a polymeric composite material must be encapsulated for forming, such as thermosets where resin viscosity can decrease during the cure cycle or thermoplastic composite forming where additional porosity/void removal is needed. In embodiments where fully encapsulation is required, the metallic sheath 14 may have at least one vacuum port or opening 16 through which a vacuum source 18 may be applied in order to vacuum atmosphere or air out from within the metallic sheath 14. The opening 16 can also be used for bleeding inert gas through the metallic sheath or quenching the workpiece in some embodiments. However, other ports can be added or utilized for these steps without departing from the scope of the technology describe herein. The metallic sheath 14 vacuum port or opening 16, once vacuumed, can be sealed by welding or other such methods. In some embodiments, the separate metal or metallic sheets can be sealed via welding or the like around a periphery of the workpiece 12, while still leaving a gap in the seal the at least one vacuum port or opening 16 through which the vacuum source 18 may apply vacuum. However, other ports can be cut into the metallic sheath 14 instead of being located at the welded/sealed seams without departing from the scope of the technology described herein.

In some alternative embodiments, the metallic sheath 14 can be made of a single sheet of metal folded into two portions between which the workpiece 12 is sandwiched. This alternative configuration can be applied for embodiments that require sealing around a periphery of the workpiece and/or embodiments in which such sealing is not required and the metallic sheath 14 covers opposing top and bottom surfaces of the workpiece 12. Furthermore, in some embodiments, the metallic sheets of the metallic sheath are consolidated with the workpiece (e.g., the composite laminate) on opposing sides of the workpiece and/or bagged with a vacuum bag or impermeable membrane and brought into intimate contact via the aid of vacuum application to contract the bag around the combination of the metallic sheath and the workpiece.

In some embodiments, the metallic sheath 14 can be machined/chemically etched to match thickness variations present in the composite laminate surface (e.g., if pad-ups or the like are present). Alternatively, materials of different conductivities can be added to one or more portions of the metallic sheath's surfaces (cold spray, selective electroplating, 3-D printing, or the like) to account for the heating variations that can arise in a variable thickness and resistance joule heated metallic sheath.

Figure 2:
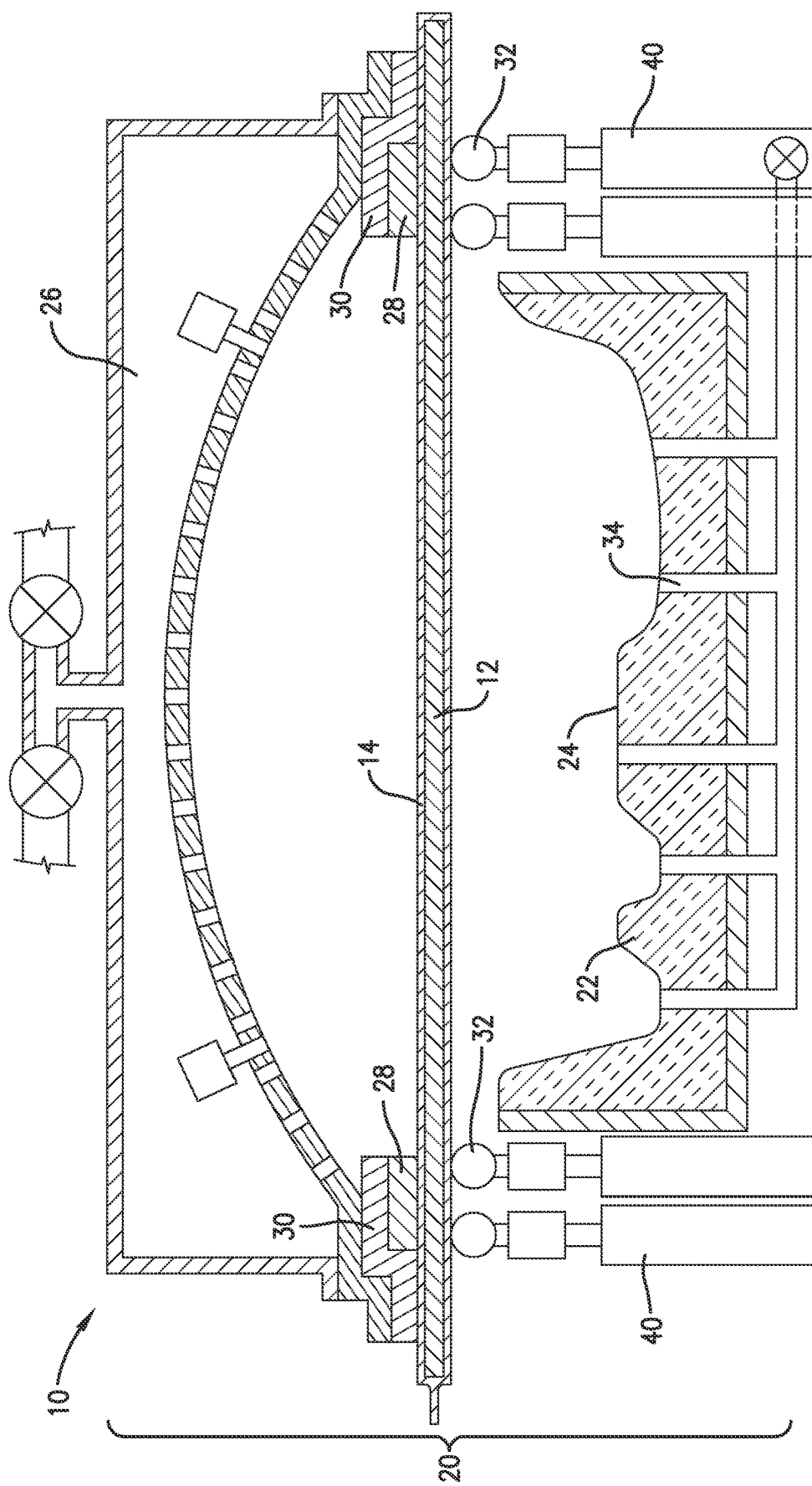
FIG. 2 is a side cross-sectional view of the composite laminate workpiece within the metallic sheath and located in a system for forming a complex composite part out of the composite laminate workpiece, in accordance with embodiments of the present invention.
Figure 3:
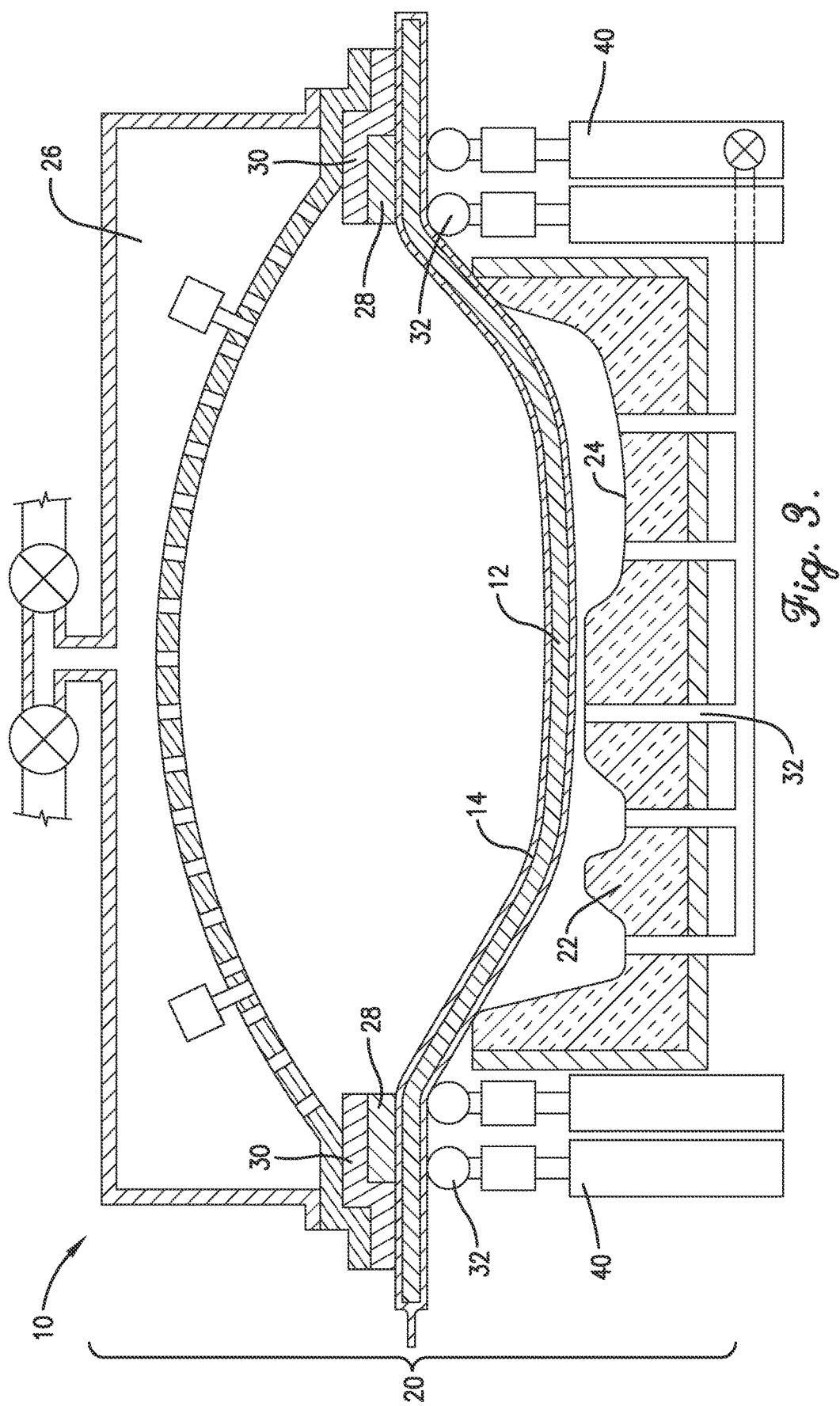
FIG. 3 is a side cross-sectional view of the system of FIG. 2 depicting the composite laminate workpiece and the metallic sheath draping partially toward a ceramic tooling surface while electric current is applied, in accordance with embodiments of the present invention.
Figure 4:
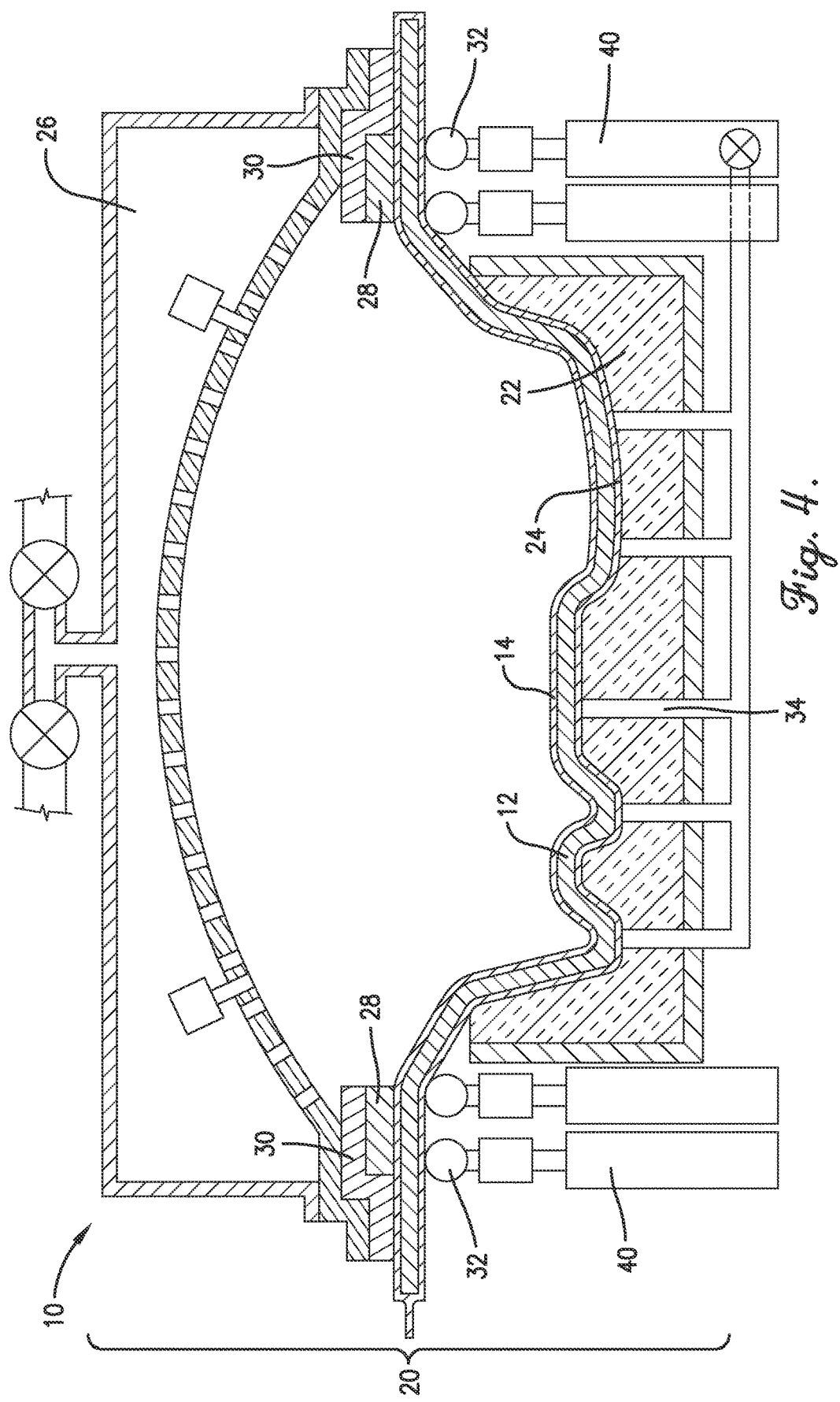
FIG. 4 is a side cross-sectional view of the system of FIG. 2 depicting the composite laminate workpiece and the metallic sheath pressed fully against the ceramic tooling surface, in accordance with embodiments of the present invention.

FIGS. 2-4 depict exemplary tooling for shaping the workpiece 12 while it is sealed within the metallic sheath 14. For example, the tooling 20 can comprise a first ceramic die 22 with a ceramic tooling surface 24, as depicted in FIGS. 2-4, and a pressure die 26 configured for sealing over the workpiece 12 and/or the metallic sheath 14 and pressing both toward the ceramic tooling surface 24. Note that while the first ceramic die 22 is depicted as being located beneath the pressure die 26, these positions can be reversed or otherwise angled or configured without departing from the scope of the technology described herein. The tooling 20 can further include one or more electrical contacts or leads 28 used to provide electric current through the metallic sheath 14 for heating of the workpiece 12. Furthermore, a variety of locations on the tooling 20 can comprise insulation 30, such as a ceramic coating or ceramic paper formed between the electrical leads 28 and the pressure die 26.

Ceramic dies, such as the first ceramic die 22, may have low thermal conductivity and are inherently good thermal insulators. Thus, the metallic sheath 14 and the workpiece 12 therein may be directly heated by passing electricity through the metallic sheath 14 via the leads 28, while the ceramic dies and other ceramic components or insulation describe herein serve as an electrical and thermal insulator, preventing current leakage into the tooling 20. In some embodiments, the first ceramic die 22 and/or other ceramic components described herein may be made from high temperature ceramic material that is electrically insulating (non-conductive), while still transparent to electromagnetic radiation. Examples of ceramic materials for use herein may include silicon dioxide, silicon nitride, aluminum oxide, and/or other electrically insulating ceramics.

The first ceramic die 22 may also comprise workpiece tension control components 32 located at opposing ends of the ceramic tooling surface 24. These workpiece tension control components 32 can be actuatable in opposite directions to enable draping of the metallic sheath 14 and the workpiece 12 therein toward the ceramic tooling surface 24 while the leads 28 apply electrical current therethrough. As depicted in FIGS. 2-4, the workpiece tension control components 32 may be ceramic rollers biasable against at least one side of the metallic sheath 14 and rotatable toward the ceramic tooling surface 24 (i.e., a first roller actuatable to rotate in a first direction/clockwise and a second roller actuatable to rotate in a second direction/counterclockwise). The rollers may be ceramic or ceramic-coated rollers, balls, or bearings and may be repositionable to increase or decrease the tightness or tension with which they are biased against the metallic sheath 14 and/or the workpiece 12. Any repositioning mechanism 40 can be used for repositioning of the rollers by any desired amount vertically, horizontally, diagonally, or otherwise depending on the shape and tooling used to shape the formed part.

The workpiece tension control components 32 can allow the workpiece 12 and the metallic sheath 14 to be partially released at either end to drape into a cavity of the first ceramic die 22, for example, as depicted in FIG. 3, without requiring as much if any stretching at that stage of the shaping described herein. The subsequent pressing of the workpiece 12 and the metallic sheath 14 against the ceramic tooling surface 24 can then allow for less stretching of the workpiece 12 during shaping thereof than if shaped without the partial release of the workpiece 12 via the ceramic rollers, for example.

Furthermore, some embodiments of the system 10 may include vents 34 or ventilation channels formed through the first ceramic die 22 and through the ceramic tooling surface 24, which may serve as vents to prevent the trapping of air between the metallic sheath 14 and the ceramic tooling surface 24. Additionally, or alternatively, the vents 34 may assist in openings for applying a pressure differential to actuate the workpiece 12. For example, the workpiece 12 and the metallic sheath 14 can be pulled toward or pushed away from the ceramic tooling surface 24 via vacuum or forced air. However, such pressure differential can be provided by the pressure die 26 without requiring vacuum via the vents 34 in some embodiments. In some embodiments, one or more of the vents 34 may be used for quenching or otherwise cooling the workpiece 12 and/or the metallic sheath 14 with inert gas while they remain in the first ceramic die 22 in order to achieve desired mechanical properties with minimal distortion.

Figure 5:
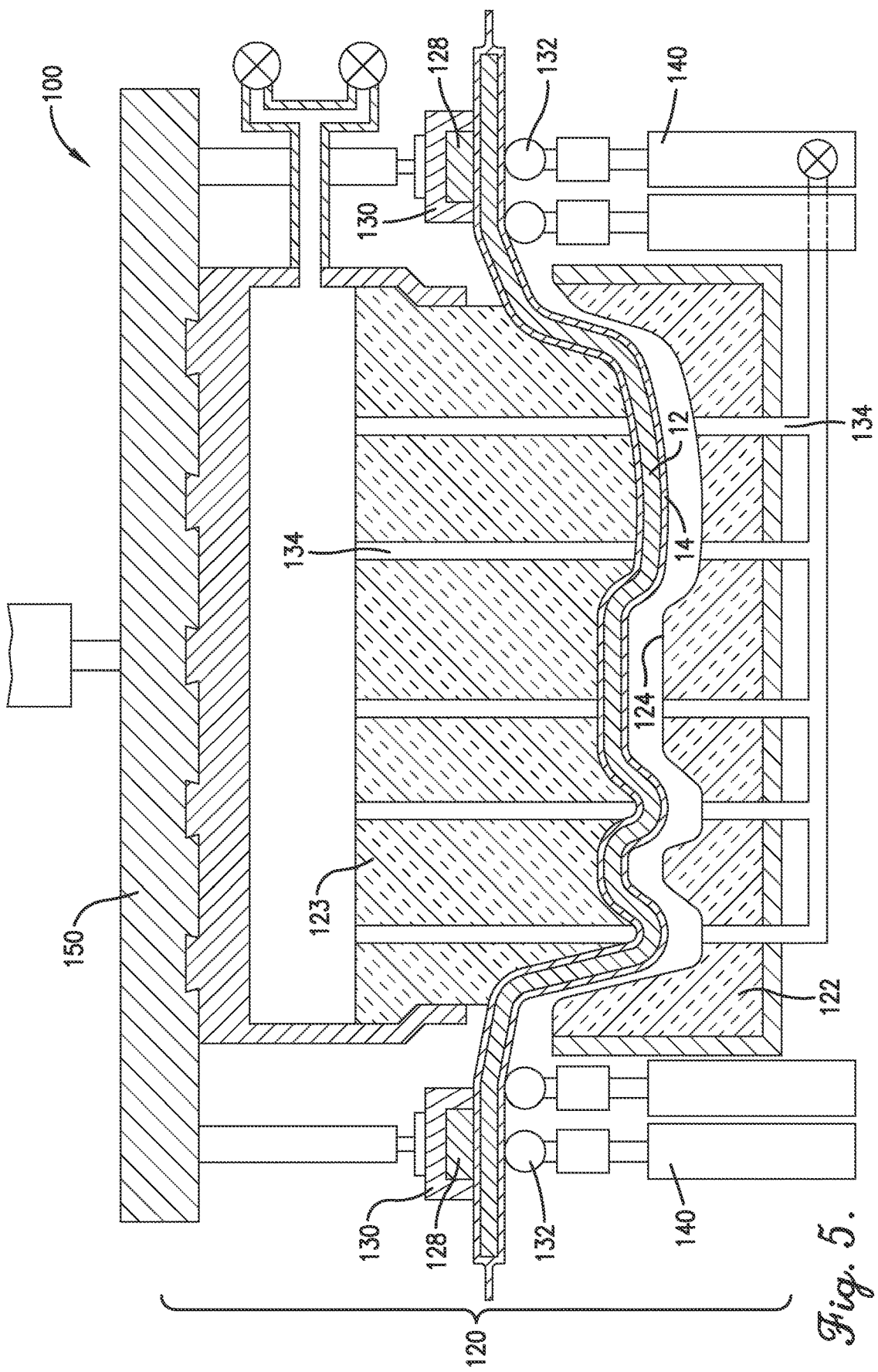
FIG. 5 is a side cross-sectional view of an alternative system for shaping the composite laminate workpiece using two mating dies, in accordance with embodiments of the present invention.

Another embodiment of a system 100 for forming the workpiece 12 and/or the metallic sheath 14 is depicted in FIG. 5 and has similar components to the system 10, including tooling 120 comprising a first ceramic die 122 sharing identical or similar features to the tooling 20 and the first ceramic die 22. However, instead of the pressure die pressure die 26, this configuration may comprise a second ceramic die 123 that is shaped, positioned, and configured to mate with the first ceramic die 122 and/or otherwise form an opposing side of the workpiece 12 than a side formed by the first ceramic die 122. For example, when the workpiece 12 and the metallic sheath 14 are placed between the first and second ceramic dies 122, 123, a press 150 may be operated to manually, electromechanically, or pneumatically press the second ceramic die 123 toward the first ceramic die 122. The system 100 can likewise include one or more ceramic tooling surfaces 124, similar to the ceramic tooling surfaces 24 of FIGS. 2-4, as well as electrical contacts or leads 128 and insulation 130, identical or similar to the leads 28 and the insulation 30 described above.

The tooling 120 may also comprise workpiece tension control components 132 similar or identical to the workpiece tension control components 32 described above, and likewise located at opposing ends of the ceramic tooling surface 124. These workpiece tension control components 132 can likewise be actuatable in opposite directions to enable draping of the metallic sheath 14 and the workpiece 12 toward the ceramic tooling surface 124 while the leads 128 apply electrical current therethrough. For example, the workpiece tension control components 132 may be ceramic rollers biasable against at least one side of the metallic sheath 14 and rotatable toward the ceramic tooling surface 124 (i.e., a first roller actuatable to rotate in a first direction/clockwise and a second roller actuatable to rotate in a second direction/counterclockwise). The rollers may likewise be ceramic or ceramic-coated rollers, balls, or bearings and may be repositionable to increase or decrease the tightness or tension with which they are biased against the metallic sheath 14 and/or the workpiece 12. Any repositioning mechanism 140 can be used for repositioning of the rollers by any desired amount vertically, horizontally, diagonally, or otherwise depending on the shape and tooling used to shape the formed part.

The workpiece tension control components 132 can allow the workpiece 12 and the metallic sheath 14 to be partially released at either end to drape into a cavity of the first ceramic die 122, for example, without requiring as much if any stretching initially. The subsequent pressing of the workpiece 12 and the metallic sheath 14 against the ceramic tooling surface 124 via the second ceramic die 123 can then allow for less stretching of the workpiece 12 during shaping thereof than if shaped without the partial release of the workpiece 12 via the ceramic rollers.

Furthermore, some embodiments of the system 100 may include vents 134 or ventilation channels that are similar or identical to the vents 34 described above and formed through the first ceramic die 122 and through the ceramic tooling surface 124, which may likewise serve as vents to prevent the trapping of air between the metallic sheath 14 and the ceramic tooling surface 124. Additionally, or alternatively, the vents 134 may assist in openings for applying a pressure differential to actuate the workpiece 12. For example, the workpiece 12 and the metallic sheath 14 can be pulled toward or pushed away from the ceramic tooling surface 124 via vacuum or forced air. Furthermore, the vents 134 may likewise be formed through the second ceramic die 123 and its associated ceramic tooling surface 124 and may similarly prevent air from being trapped between the metallic sheath 14 and the ceramic tooling surface 124. Likewise, the vents 134 formed through the second ceramic die 123 may additionally or alternatively be used to apply pressure differential force or vacuum for moving the workpiece 12 and the metallic sheath 14 toward or away from the second ceramic die 123.

Figure 6:
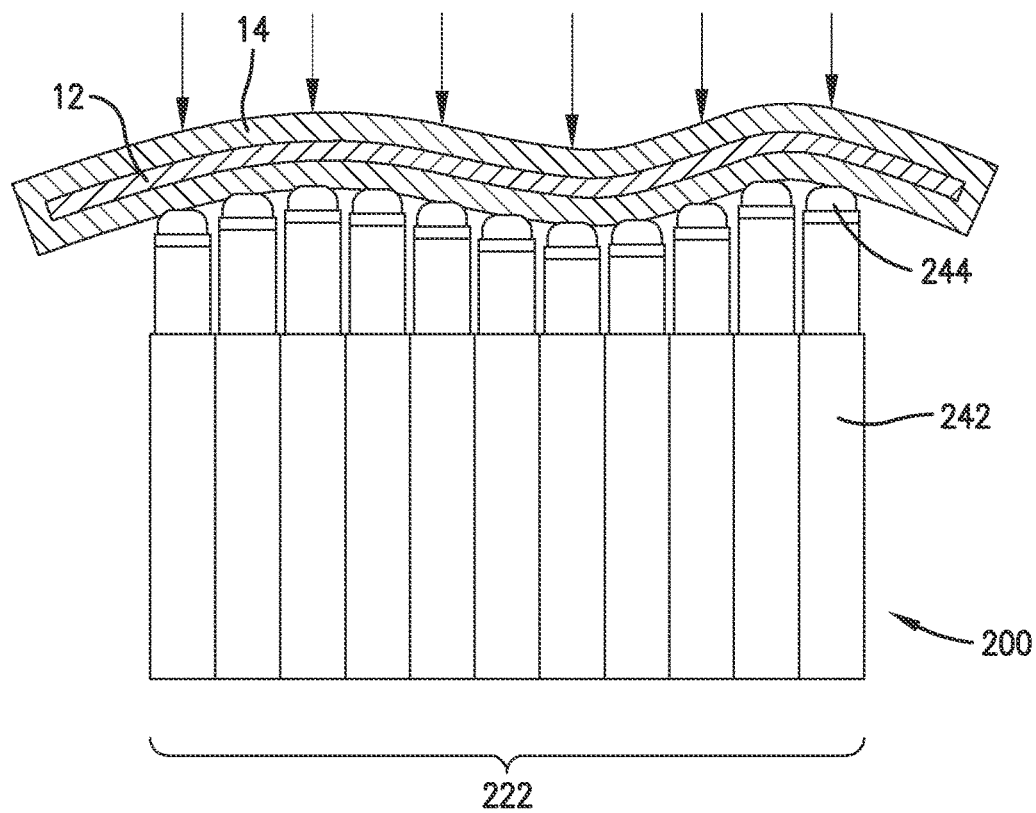
FIG. 6 is a side cross-sectional view of another alternative system for shaping the composite laminate workpiece using a ceramic-coated bed of nails configuration, in accordance with embodiments of the present invention.

In yet another alternative embodiment depicted in FIG. 6, a system 200 may have similar or identical components and configurations to the systems 10 and/or 100 described above, but the first ceramic die 22 and/or 122 can be replaced with a fixed or reconfigurable "bed of nails" tooling 222. The bed of nails tooling 222 may comprise a plurality of shafts 242 extending at varying lengths to support the workpiece 12 in a desired curvature or complex-shaped configuration. The plurality of shafts 242 can be made of an insulating material such as ceramic material and/or can have tips 244 thereof covered with insulating material such as ceramic material. Each of the plurality of shafts 242 may be actuatable via automated and/or manual techniques known in the art to reconfigure the bed of nails tooling 222 to a desired part configuration, shape, or curvature.

Figure 7:
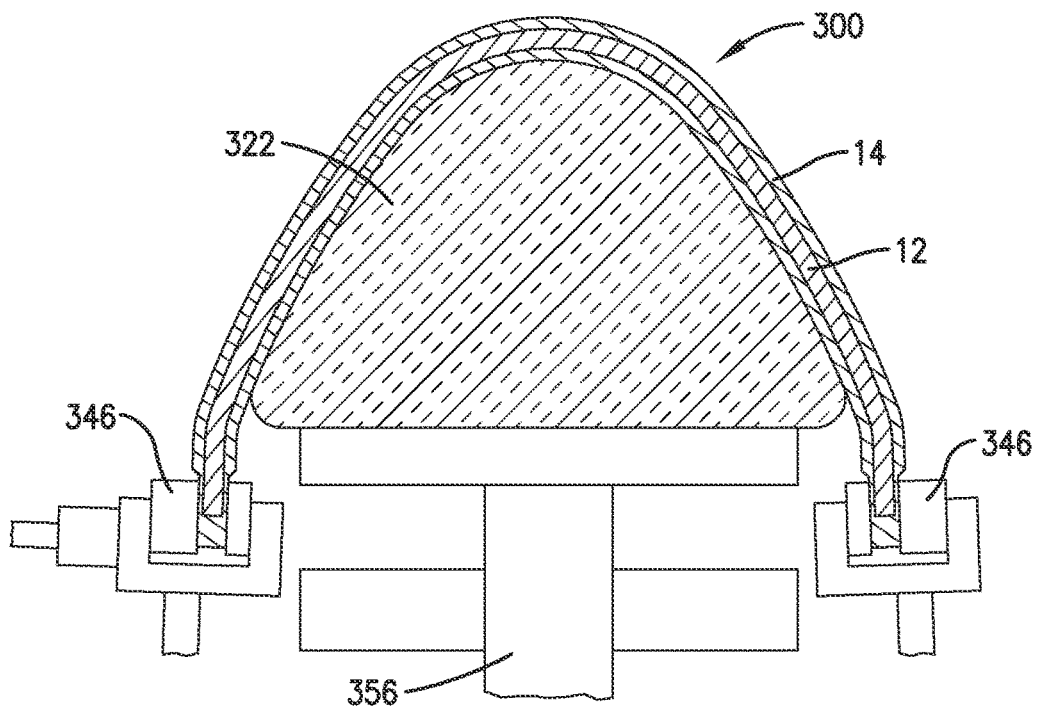
FIG. 7 is a side cross-sectional view of the metallic sheath and the composite laminate workpiece being shaped on an inverted ceramic die via stretch forming, in accordance with embodiments of the present invention.

In some embodiments, as depicted in FIG. 7, a system 300 may have similar or identical components and configurations to the systems 10 and/or 100 described above, but with the first ceramic die 22 or 122 replaced with a first ceramic die 322 over which the workpiece 12 and the metallic sheath 14 are stretched. Specifically, the system 300 may accommodate stretch forming of the workpiece 12 by inverting ceramic tooling so that the ceramic tooling acts like a punch instead of a die, as depicted in FIG. 7. This stretching can be performed via clamps 346 which can be actuated away from the first ceramic die 322 to stretch-form the workpiece 12 while electric current is applied through the metallic sheath 14. Additionally or alternatively, the first ceramic die 322 can be actuatable manually, hydraulically, electromechanically, or the like via one or more actuators 356 to increase the stretching tension applied to the workpiece 12 during forming using the methods later described herein. In some embodiments, the clamps 346 can incorporate the electrical contacts or leads therein without departing from the scope of the technology described herein.

Figure 8:
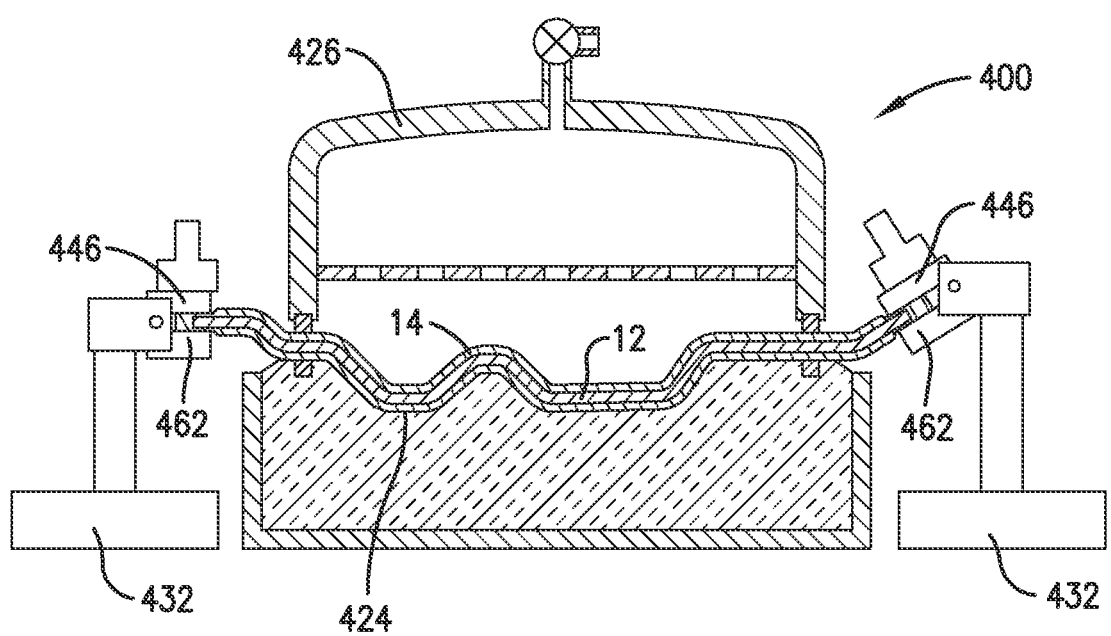
FIG. 8 is a side cross-sectional view of yet another alternative system for shaping the composite laminate workpiece including individually adjustable clamps, in accordance with embodiments of the present invention.

In yet another embodiment, as depicted in FIG. 8, a system 400 may be similar or identical to system 10 as described above, but the rollers depicted for the workpiece tension control components 32 may be replaced with different workpiece tension control components 432 which may comprise translatable frame pieces instead of rollers or the like as described above. However, the system 400 may still comprise a first ceramic die 422, a ceramic tooling surface 424, and a pressure die 426 that are similar or identical to the first ceramic die 22, the ceramic tooling surface 24, and/or the pressure die 26, respectively.

Specifically, the workpiece tension control components 432 in this and any of the other embodiments described herein may be translatable frame pieces fixedly attachable (e.g., via clamps 446 or the like described below) to opposing edge portions of the metallic sheath 14 and configured to be translated laterally toward the ceramic tooling surface 424. These workpiece tension control components can allow the workpiece 12 and the metallic sheath 14 to have opposing end regions moved closer to each other to release tension in the workpiece 12 and allow the workpiece 12 to drape into a cavity of the first ceramic die 422, for example, without requiring as much if any stretching at that stage of the shaping described herein. The subsequent pressing of the workpiece 12 and the metallic sheath 14 against the ceramic tooling surface 424, as depicted in FIG. 8, can then allow for less stretching of the workpiece 12 during shaping thereof due to this pre-stretch draping.

The system 400 may comprise two or more clamps 446 selectively and/or fixedly attaching the metallic sheath 14 and the workpiece 12 therein to the translatable frame pieces. However, these clamps 446 may be used in conjunction with other embodiments where the translatable frame pieces are omitted or are fixed without departing from the scope of the technology herein. That is, the clamps 446 can alternatively serve to merely hold the workpiece 12 and the metallic sheath 14 in place relative to shaping surfaces described herein such as the ceramic tooling surface 24.

Figure 9A:
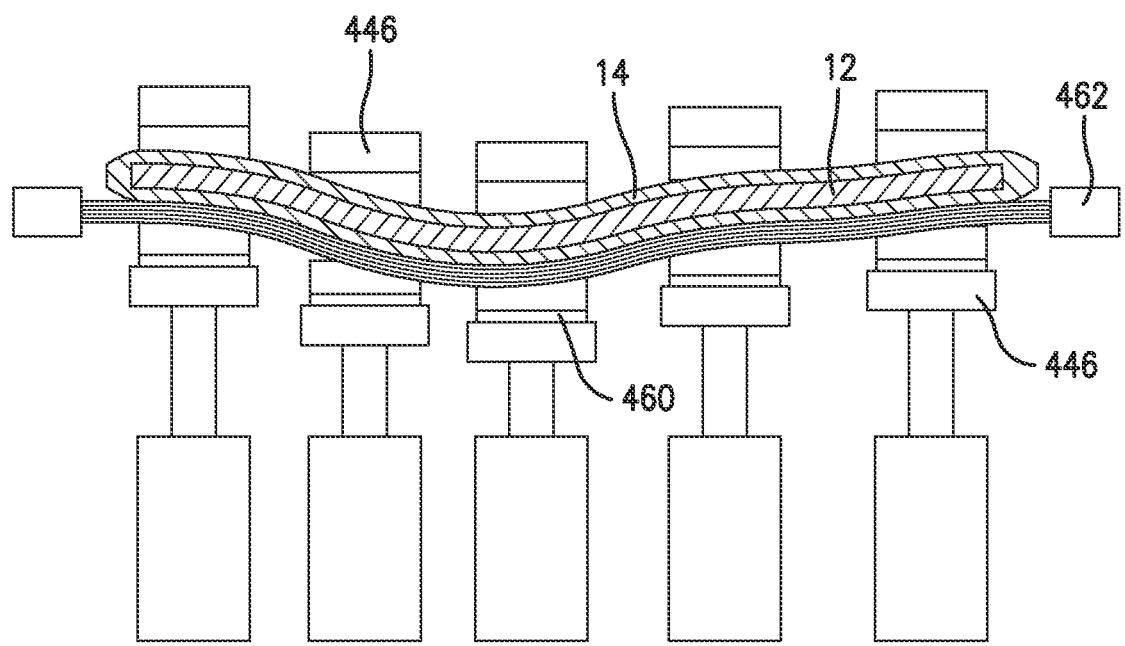
FIG. 9a is an alternative side cross-sectional view of the clamps of FIG. 8 with flexible copper leads sandwiched in the clamps, in accordance with embodiments of the present invention.
Figure 9B:
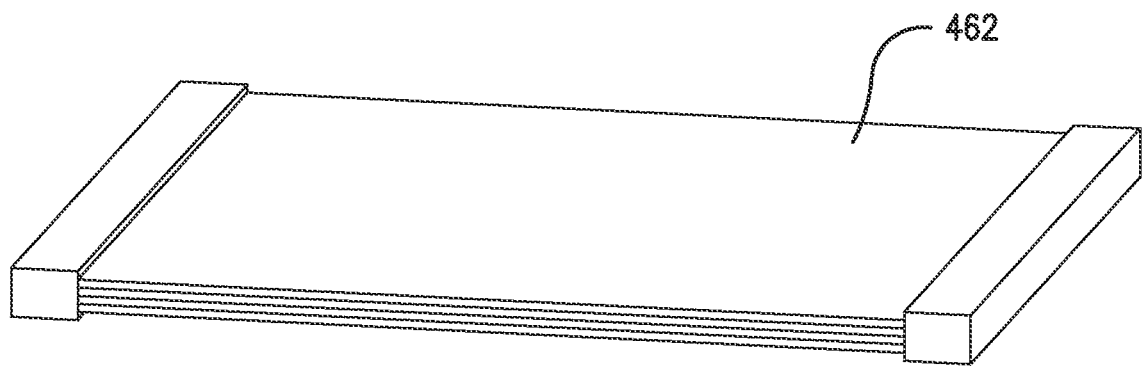
FIG. 9b is a side cross-sectional view of the flexible copper leads of FIG. 9a, in accordance with embodiments of the present invention.

In some embodiments, the clamps 446 may comprise a series of independent clamps selectively attachable to the metallic sheath 14 and/or the workpiece 12, as depicted in FIG. 8 or 9a. The clamps 446 may have ceramic clamp inserts 460 made of ceramic or the like to electrically isolate the clamps 446 or tooling supporting the clamps 446 from the current applied to the workpiece 12. The clamps 446 can comprise clamp jaws or the like that can be manually, mechanically, electro-mechanically, hydraulically, or otherwise forced toward each other to clamp onto the workpiece 12 and metallic sheath 14. Furthermore, to apply uniform current, flexible electric contacts or leads 462 in the form of a bundle of flat copper sheets may be used between the ceramic clamp inserts 460 and the metallic sheath 14 in some embodiments, as depicted in FIGS. 9a and 9b. The flexible electric contact or leads 462 can be used in other embodiments described herein as well, such as any of those depicted in FIGS. 2-7.

In use, any of the systems described above in FIGS. 1a-9b and/or other equivalents may produce a complex-shaped composite part. Generally, the metallic sheath 14 may be placed around or at least partially around a composite laminate workpiece (e.g., the workpiece 12) and, in some embodiments, vacuum sealed around the workpiece 12. The workpiece 12 may be heated via resistance or joule heating of the metallic sheath 14 to forming temperatures via application of electric current through the metallic sheath 14. Gas pressure or another physical force may be applied on one side of the metallic sheath 14 and may drive or bend the workpiece 12 and the metallic sheath 14 into an intermediate form, such as draped within a cavity of a ceramic die (e.g., the first ceramic die 22). Some rotatable or translatable components allow the heated workpiece 12 and the metallic sheath 14 to be pushed into the intermediate form without significant stretch, such as the workpiece tension control components 32 described above. Once in the intermediate form, controlled differential pressure may drive the workpiece 12 fully into a ceramic die cavity and/or otherwise fully against the ceramic tooling surface 24 or the like to achieve complex shapes without excessive localized stretching. In some embodiments, intermittently pushing the workpiece up after it has partially touched the ceramic tooling surface 24 can be used to assist with temperature uniformity as electric current can reheat any area of the workpiece 12 cooled by heat transfer. Once resistance heated for a required length of time at a required temperature, the resulting formed part can be cooled and the metallic sheath 14 can be removed from the resulting formed part.

Figure 10:
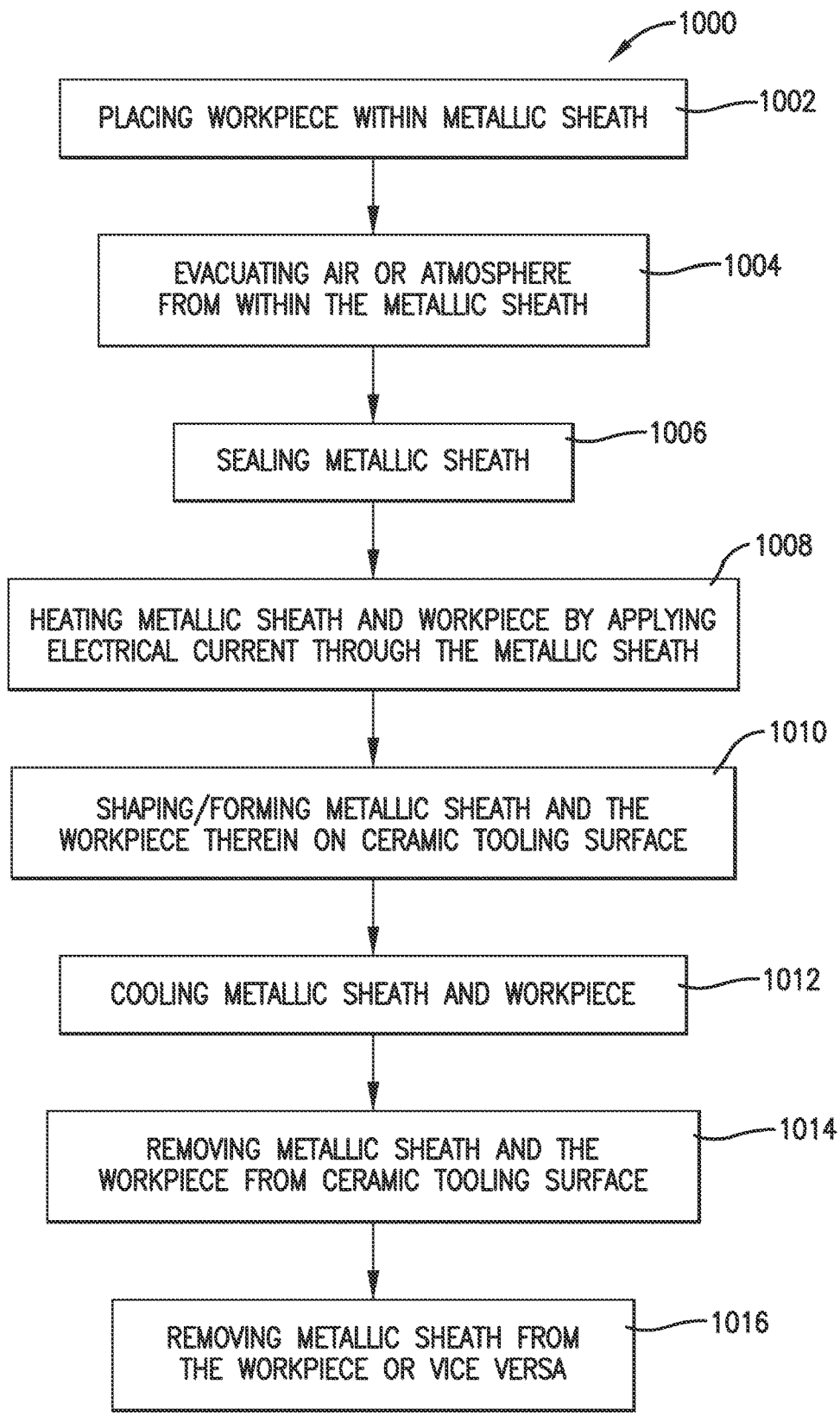
FIG. 10 is a flow chart of a method for manufacturing a complex-shaped composite part in accordance with embodiments of the present invention.

The flow chart of FIG. 10 depicts the steps of an exemplary method 1000 for manufacturing a simple or complex-shaped composite part or structure in more detail. In some embodiments, various steps may be omitted, or steps may occur out of the order depicted in FIG. 10 without departing from the scope of the technology as described herein. For example, two blocks shown in succession in FIG. 10 may in fact be executed substantially concurrently, or blocks may sometimes be executed in the reverse order depending upon the functionality involved.

Figure 1B:
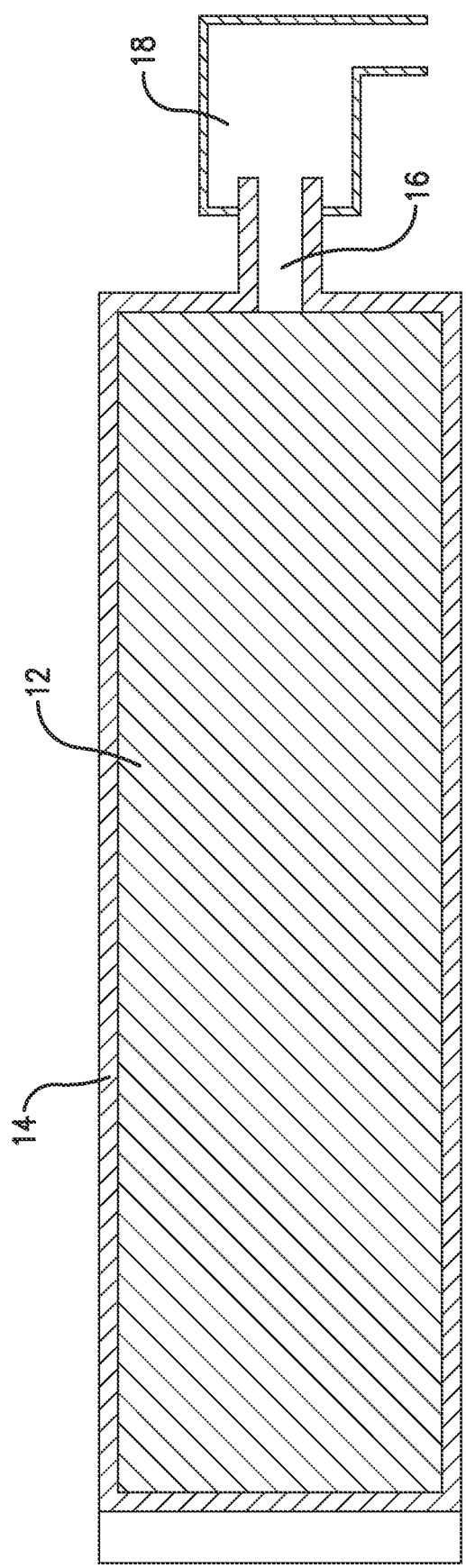
FIG. 1b is a top cross-sectional view of the composite laminate workpiece within the metallic sheath of FIG. 1a, in accordance with embodiments of the present invention.

In some embodiments, the method 1000 includes a step of placing the workpiece 12 within (and/or between sheets of) the metallic sheath 14 as depicted in block 1002 and FIGS. 1a-1b. The metallic sheath 14 may be formed, for example, by sandwiching the workpiece between two ductile metal sheets or metal plates. These metal plates, in some embodiments, can additionally be welded together to form a cavity or envelope surrounding the workpiece 12. The metallic sheets or plates used to form the metallic sheath may each be, for example, a foil gauge down to 0.010 inch or the like. In some alternative embodiments, a single metallic sheet or plate may be folded, and the workpiece may be placed between two resulting portions of the single metallic sheet forming the metallic sheath 14, as described above.

The thickness of the sheet(s) or plate(s) used to form the metallic sheath 14 may additionally be optimized to further insulate the workpiece 12 from direct contact with the ceramic tooling 20 or ceramic tooling surface 24 and the like described above to protect the workpiece's surfaces from surface irregularities of the tooling 20 used for shaping of the workpiece 12. For example, dimpling or other such surface imperfections can impact the metallic sheath 14 but not the workpiece 12 if the thickness of the metallic sheath 14 is sufficient for such protection, particularly for embodiments where the ceramic tooling surface is formed by re-configurable dies (e.g., a bed of nails tooling configuration as described herein and depicted in FIG. 6). The metallic sheath 14 can also protect the workpiece's surfaces from damage in case of presence of loose ceramic particles on the ceramic die surface 24, for example.

Some embodiments include coating applied inside surfaces of the metallic sheath 14 (i.e., on surfaces facing the workpiece) with a release agent (not shown) or ceramic coating to prevent bonding of the workpiece 12 to the metallic sheath 14. The release agents or coating may be typical coatings made of boron nitride, aluminum oxide, silicon dioxide, titanium oxide, yttrium oxide, zircon, partially stabilized zirconium oxide, and/or, ceramic paper (e.g., felt) for example. Preventing such bonding can assist in post-forming removal of the resulting formed part from the metallic sheath 14.

The step of placing the workpiece 12 within the metallic sheath 14 may also include, in some embodiments, welding the two metallic sheets or plates together. "Welding," as used herein, may refer to resistance welding or any other types of welding known in the art for sealing peripheral portions of the two metallic sheets or plates together. The welding may be performed all around peripheral edges or edge portions of the plates or sheets except for at the opening 16 (e.g., an inlet, outlet, or port), as depicted in FIGS. 1a-1b, thus creating a welded chamber (i.e., the metallic sheath 14) out of the plates with an open port for a subsequent evacuation or vacuum step. However, note that the workpiece 12 may be placed into any metallic sheath having at least one open port using other techniques without departing from the scope of the technology herein. Alternatively, as noted above, the metallic sheath 14 can be two metal sheets or plates that sandwich the workpiece 12 therebetween but are not welded around edges thereof The method 1000 can also include evacuating air or atmosphere via the opening 16 from within the resulting metallic sheath 14 (e.g., via vacuum or other such evacuation methods), as depicted in block 1004. Along with the air or atmosphere evacuated therefrom, water vapor and or other contaminants may also be removed during this step. The method 1000 can further include a step of sealing (e.g., welding) the opening 16 of the metallic sheath 14 shut immediately following evacuation and/or while evacuation is still in process, as depicted in block 1006, in order to create a ductile vacuum sealed enclosure. The workpiece 12 fully sealed/welded within the metallic sheath 14 is depicted in FIGS. 1a-1b. Note that the steps depicted in blocks 1004 and 1006 can be omitted for embodiments in which the metallic sheath 14 is two metal sheets sandwiching the workpiece 12 therebetween but not welded together. Furthermore, the steps depicted in blocks 1004 and 1006 can be replaced with or subsequently supplemented with the steps of bagging the metallic sheath 14 and the workpiece 12 with an impermeable membrane and applying a pressure differential such as vacuum evacuation of atmosphere therein to contract the impermeable membrane such that it comprises the metallic sheath 14 and the plies of the workpiece 12 together.

The method 1000 further includes a step of heating the metallic sheath 14 with the workpiece 12 by applying electrical current to the metallic sheath 14, as depicted in block 1008 and FIGS. 2-5 and 7-8. For example, the electric current (e.g., using high-amperage, low voltage power supply) applied to the metallic sheath 14 may be sufficient to heat the workpiece to above approximately 700 degrees F. in some embodiments, while still remaining below a melting point of the metallic sheath 14. However other temperature ranges may be used without departing from the scope of the technology described herein and may depend on the materials used and the type of composite laminate.

Direct heating of the workpiece only can be significantly faster and more energy efficient than heating the tooling 20 (e.g., die) and/or a furnace or oven surrounding the tooling in addition to the workpiece/part to be formed. Controlled application of electric current before and/or during shaping of the workpiece 12 and as the metallic sheath 14 touches the die or ceramic tooling surface 24 ensures the workpiece 12 maintains proper temperature throughout the shaping/forming process. For example, the energized metallic sheath 14 thermally insulates the workpiece 12 from initial contact to the dies to prevent localized cooling or ply freezing, which can lead to defects in the part.

The electric current can be applied to the metallic sheath 14 and the workpiece 12 directly via joule heating and/or indirectly via induction heating. Additionally or alternatively, the electric current can be a controlled, pulsed current that is pulsed at particular frequencies and may be used to allow formation at lower temperatures. In some embodiments, temperature of the electrically heated workpiece 12 and/or the metallic sheath 14 surrounding the workpiece 12 may be continuously monitored and current may be adjusted accordingly to heat the workpiece 12 uniformly to a desired temperature range for forming of the workpiece into a final formed part. In some embodiments the heating and post-forming cooling can be controlled via controlled passage of electricity through the metallic sheath with closed loop controls to achieve desired level of crystallinity for thermoplastic composites or proper curing for thermoset composites. For example, controlled cooling (e.g. via removing the electric current, turning the electric current off, and/or by applying cooling inert gas or alternative cooling techniques known in the art) while the workpiece is still inside the dies can be used to achieve a desired level of crystallization.

The method 1000 further includes a step of shaping the metallic sheath 14 and the workpiece 12 therein, as depicted in block 1010. Shaping of the workpiece into the formed part can be accomplished by applying various forming stresses applied during the heating being applied via electric current, as described above. Forming stresses may be applied by using differential pressure, match dies, or stretch forming equipment, for example, such as those depicted in FIGS. 2-8. Such techniques can be used for pressing and/or stretching the workpiece 12 into a desired shape of a final complex-shaped composite part. In some embodiments, ceramic tooling such as ceramic dies described above, can be used for shaping the metallic sheath 14 and the workpiece 12 therein or therebetween during hot forming of the metallic sheath 14 and workpiece 12. The ceramic die, ceramic dies, or other ceramic tooling described herein can be used as electric insulators to enable simultaneous application of electric current during forming.

Following heating and shaping steps, the method 1000 comprises a step of cooling the metallic sheath 14 and the workpiece 12, as depicted in block 1012, then removing the metallic sheath 14 and the workpiece 12 from the tooling 20 or other ceramic tooling described herein, as depicted in block 1014. This cooling can be performed by removing the electric current, turning the electric current off, and/or by applying cooling inert gas or alternative cooling techniques known in the art. Following removal of the metallic sheath 14 and the workpiece therein 12, the method may include removing the metallic sheath 14 from the workpiece 12 (which is now the formed part in its simple or complex shape), as depicted in block 1016. Specifically, welded (or otherwise sealed) edges of the metallic sheath 14 may be cut off as needed and/or the two plates or metallic sheets may be removed from the workpiece 12 or resulting formed part/composite part. Specifically, some embodiments of the method 1000 include cutting open the metallic sheath 14 and removing the metallic sheath 14 from the formed part (or alternatively removing the formed part from the metallic sheath 14). Then the resulting formed part may be trimmed, punctured, drilled, or machined in any way desired for finishing the shaped final part. The method 1000 thus produces complex shapes from uncured composite laminate in very few steps followed by trimming and drilling to the formed part detailed configuration.

In some embodiments, following formation of the formed part as described above, the formed part may be subsequently inspected using non-destructive methods. Such non-destructive methods may include, for example, ultrasonic inspection, radiographic methods including real-time and computed tomography, thermographic inspection, and various other techniques with process parameters optimized to ensure full compliance with quality requirements for a given finished part.

Furthermore, in some embodiments, once minimum time at temperature is reached, argon, nitrogen gas, or argon helium mixture can be sprayed from one or both sides of the workpiece via the vents 34 or 134 for uniform cooling and/or rapid quenching. For example, inert gas can be applied to the workpiece via one or more ports or openings formed into the metallic sheath 14, which may be the same or different openings than those used to vacuum atmosphere out from within the metallic sheath. Likewise, the same lines used for vacuum or pressure can be used to spray the inert gas or inert quench medium to rapidly cool the formed part.

In some alternative embodiments of the method 1000 described above, the shaping step can further include reconfiguring ceramic dies for different shapes or curvatures, resulting in formed parts having different shapes or curvatures. As described above, this reconfiguring can be done manually or automatically by actuating portions of ceramic tooling described herein and/or by trading out selectable ceramic pieces of various shapes and curvatures to piece together a new complex-shaped surface for shaping the formed part. Specifically, the ceramic dies or tooling 20 described herein can be made from reconfigurable tooling of other materials with ceramic inserts, insulation, and/or coating placed therein or thereon for mating with the metallic sheath 14 during shaping or forming of the workpiece 12. Thus, while other non-insulating materials can be used in the tooling 20 for shaping of the formed part, the ceramic inserts, insulation, or coating can insulate the metallic sheath 14 and/or the workpiece 12 from any conductive portions of such tooling 20. In one alternative embodiment, ceramic tooling may include a "bed of nails" made of ceramic or insulated by ceramic tips, as depicted in FIG. 6 and described above. Ceramic insulation may likewise be used to electrically isolate electrical clamps, as depicted in FIGS. 7a and 7b, as well as other forming equipment supporting the ceramic tooling from current leakage.

Direct heating of the workpiece 12 via the metallic sheath 14 by application of electricity advantageously may not require heating of the ceramic tooling or dies described herein in some embodiments. Furthermore, the energized metallic sheath 14 thermally insulates the workpiece from initial contact with the ceramic tooling (e.g., the ceramic dies). Specifically, in some embodiments, the heating and shaping steps above may further comprise intermittent raising/lifting of the metallic sheath 14 with the workpiece 12 therein from the ceramic tooling surface 24 (or other ceramic forming surfaces described herein) while the workpiece 12 is still energized, which helps equilibrate temperature. For example, the methods described herein may additionally include raising the metallic sheath 14 and the workpiece 12 away from the ceramic tooling surface 24 or 124 to ensure temperature uniformity is maintained during heating and/or shaping of the workpiece 12. This may be particularly helpful when the metallic sheath 14 partially contacts the ceramic tooling surface 24 or 124 as the entirety of electric current is passed through the metallic sheath 14 and thus the ceramic tooling surface 24 or 124 is essentially heated indirectly via conduction, convection, and radiation heat transfer from the metallic sheath 14.

This raising and lowering can be accomplished via pressure differential applied as described herein and/or by raising or lowering various clamps or the like to which the metallic sheath 14 and/or the workpiece 12 are attached. The ability to intermittently raise the workpiece 12 and metallic sheath 14 off the ceramic tooling surface 24 or 124 during forming can also allow draping of or pushing the heated metallic sheath 14 and the workpiece 12 partly into a die or tooling cavity without stretching the workpiece 12. Furthermore, raising the workpiece 12 and the metallic sheath 14 surrounding it slightly off the dies or ceramic tooling, immediately shutting off the power or current flowing through the metallic sheath 14 when a correct temperature for a correct amount of time is achieved, and/or quenching/cooling using the various tooling and techniques described herein can also be used in some embodiments to achieve desired mechanical properties.

Sacrificial sheets such as the metallic sheath 14 described herein to protect the workpiece 12 can also be useful during the shaping step as an interpolator or as a diaphragm to assist forming the workpiece 12, to protect the workpiece 12 from surface damage or surface irregularities, and/or to help avoid tearing, buckling, or wrinkling of the workpiece 12 during heating and shaping thereof. The metallic sheath 14 can also locally yield and reduce strain on the workpiece's composite laminate fiber reinforcements when forming complex configurations. In one embodiment, the workpiece 12 may be heated above the melt temperature of the matrix of the workpiece, typically between 500° F. and 800° F., very rapidly over reconfigurable tooling as described herein, and the metallic sheath 14 can act as a diaphragm/interpolator, protecting surfaces of the workpiece 12 from dimpling when formed over a bed of nails configuration as described above and depicted in FIG. 6, for example. That is, in some embodiments, the metallic sheath 14 may have a thickness sufficient to work similar to how a rubber diaphragm works for forming parts at room temperature or warm forming over reconfigurable tooling such as the bed of nails tooling.

In some embodiments, the shaping step depicted in block 1010 and described above can comprise displacement followed by workpiece deformation. Specifically, the shaping step in method 1000 can further include controlled stretching techniques applied to the workpiece 12 and the metallic sheath 14 and/or any combination of wrapping or pre-stretch drawing of the workpiece 12 and metallic sheath 14 into the die or mold cavities depicted herein. For example, ceramic or ceramic-coated rollers, balls, or bearings, as depicted in FIGS. 2-4 can facilitate movement of the workpiece 12 (or feeding thereof) at least partially into the tooling 20 or ceramic die cavity (i.e., workplace displacement) without stretching the workpiece 12, thus minimizing localized thinning of the workpiece 12 during stamp forming. This way the final shape is achieved in two or more stages, with first the workpiece 12 and its metallic sheath 14 flowing or draping into the tooling 20 or die cavity with minimum or stretching, and then final settling of the workpiece 12 against the ceramic tooling surface 24 or 124, which can advantageously result in less localized thinning than forming by stretching the workpiece 12 and metallic sheath 14 throughout the entirety of the shaping/forming operation.

Where the shaping step comprises displacement followed by workpiece deformation, the rollers, balls, or bearings depicted in FIGS. 2-4 may be configured to allow passage of the workpiece therebetween and into a cavity of the tooling 20 or the first ceramic die 22 via weight of the workpiece 12 and gravity and/or vacuum force via the vents 34 or otherwise. Furthermore, the reconfigurable tooling and/or the rollers, balls, or bearings may be automated and/or manually actuated to feed a portion of the workpiece inward, such that it drapes into the cavity of the first ceramic die 22. However, as depicted in FIGS. 5 and 8, instead of the rollers, other translatable frame pieces 452 can be attached via opposing end or edge clamps (e.g., the clamps 446) affixed to the translatable frame pieces 452. The translatable frame pieces 452 can actuate the clamps 446 toward and away from each other controlling tension and/or facilitating movement of the workpiece 12 and the metallic sheath 14, such as when the workpiece 12 is drawn into a die cavity or tooling, as described above. These and other such alternative methods may provide a controlled degree of tension applied at opposing ends or edge areas of the metallic sheath 14 while it is being heated and shaped and may help balance bending and stretching to optimize forming for certain shapes.

Additionally or alternatively, this pre-stretch drawing of the workpiece 12 and the metallic sheath 14 can further comprise applying gas pressure or differential pressure between a top and bottom die (e.g., between the first ceramic die 22 and the pressure die 26 or between the first ceramic die 122 and the second ceramic die 123), forcing the workpiece 12 and the metallic sheath 14 to slide into a cavity of the tooling 20 or a cavity of one of the dies with minimum or no stretch. For example, as depicted in FIGS. 2-5 and described above, the first ceramic die 22 or 122 and/or the second ceramic die 123 can have one or more ports or vents 34 or 134 formed therethrough to a forming surface of the tooling or dies, serving as vents to prevent the trapping of air between the metallic sheath 14 and the ceramic tooling surfaces 24 or 124 and/or to additionally assist in creating a pressure differential. For example, vacuum through the vents 34 can pull the workpiece 12 and the metallic sheath 14 toward the ceramic tooling surface 24, as in FIGS. 2-4. In other embodiments, pressure can be forced through the vents 134 on one side and vacuum can be applied on another side of the metallic sheath 14 to assist in drawing the workpiece 12 and the metallic sheath 14 around the workpiece 12 into a cavity of the tooling or first ceramic die 122, as depicted in FIG. 5. Using such differential gas pressure to form the partially draped/drawn workpiece 12 into one of the dies can require use of additional seals (not shown) between the dies, preventing pressurized gas from escaping via leakage. Advantageously, compensating for the tendency of the workpiece 12 to stretch using the techniques described herein can also compensate for the tendency of the workpiece 12 to wrinkle along a concave surface thereof during forming, for example.

Although the invention has been described with reference to the preferred embodiment illustrated in the attached drawing figures, it is noted that equivalents may be employed and substitutions made herein without departing from the scope of the invention as recited in the claims of a subsequent regular utility patent. Specifically, components described for the various exemplary systems described above and depicted in FIGS. 2-9b can be interchanged and combined with components of any of the other embodiments without departing from the scope of the technology as described herein. For example, the flexible copper leads 462 can be used in place of any of the electrical leads described herein, such as those depicted in FIGS. 2-7.

Furthermore, the methods herein can be used with traditional stamp form tooling materials (such as mild steel), instead of the non-conductive (e.g., ceramic) dies and tooling described herein, with the electric current application removed before forming. However, some advantages of the systems and methods described herein come with the utilization of non-conductive tooling (such as ceramic) where the current can be applied throughout the forming process. This removes the need to get the part under pressure in just a few seconds, since the forming temperature is maintained throughout the forming process. An added benefit is that there is no potential for localized and premature cooling of the part before the forming process is complete, reducing the potential for wrinkle and defect formation. Likewise, the press can move slower to allow for adequate ply slippage to ensure adequate ply booking which will reduce defect formation potential.

Having thus described one or more embodiments of the invention, what is claimed as new and desired to be protected by Letters Patent includes the following:

The invention claimed is:

1. A method of manufacturing a complex-shaped composite part, the method comprising:
   applying a metallic sheath around at least two opposing surfaces of a workpiece, wherein the workpiece is a composite laminate;
   applying an electric current through the metallic sheath to heat the workpiece;
   shaping the workpiece in the metallic sheath into the complex-shaped composite part; and
   cooling the complex-shaped composite part;
   wherein shaping comprises at least partially drawing the metallic sheath through non-conductive rollers, biased against at least one side of the metallic sheath and located at opposing edge regions of the metallic sheath, toward a non-conductive tooling surface and then fully compressing the metallic sheath with the workpiece therein against the non-conductive tooling surface while electric current is applied through the workpiece.

2. The method of claim 1, further comprising removing the metallic sheath from the complex-shaped composite part.

3. The method of claim 1, wherein the workpiece is made of a fiber reinforced thermoplastic or thermoset composite laminate.

4. The method of claim 1, wherein the non-conductive tooling surface comprises inward-facing surfaces of two mating ceramic dies.

5. The method of claim 1, wherein the non-conductive tooling surface is a ceramic die surface within a pressure chamber.

6. The method of claim 1, wherein the non-conductive tooling surface is a plurality of non-conductive tooling surfaces each on one of a plurality of reconfigurable shafts, wherein the plurality of reconfigurable shafts are each independently actuatable to extend by varying lengths to cooperatively form different shaped contours from the plurality of non-conductive tooling surfaces.

7. The method of claim 1, wherein some portions of the metallic sheath have different conductivities or thicknesses than other portions of the metallic sheath.

8. The method of claim 1, wherein applying the metallic sheath further comprises fully enclosing the workpiece in the metallic sheath and evacuating atmosphere through an opening of the metallic sheath.

9. The method of claim 8, further comprising sealing the opening of the metallic sheath during or following said evacuating, as well as cutting open and removing the metallic sheath from the complex-shaped composite part after cooling.

10. The method of claim 1, wherein the metallic sheath comprises sheet metal including one or more of cobalt base alloys, nickel base alloys, heat resistant and corrosion resistant steels, Maraging steels, ultrahigh strength steels, stainless steel, aluminum, titanium alloys, and extreme temperature refractory alloys.

11. The method of claim 1, wherein a sacrificial foil or sheet is placed between the metallic sheath and the workpiece or wherein inside surfaces of the metallic sheath are coated with a release agent or pre-oxidized to prevent bonding of the workpiece to the metallic sheath.

12. A method of manufacturing a complex-shaped composite part, the method comprising:
   applying a metallic sheath around at least two opposing surfaces of a workpiece, wherein the workpiece is a composite laminate;
   applying an electric current through the metallic sheath to heat the workpiece;
   shaping the workpiece in the metallic sheath into the complex-shaped composite part; and
   cooling the complex-shaped composite part;
   wherein opposing edge portions of the metallic sheath and the workpiece are fixedly attached to clamps on translatable frame pieces, wherein shaping further comprises the translatable frame pieces translating toward each other as the metallic sheath with the workpiece therein is drawn into a non-conductive tooling cavity while the electric current is applied.

13. The method of claim 12, wherein shaping the workpiece in the metallic sheath comprises pressing the workpiece in the metallic sheath between two or more non-conductive dies.

14. The method of claim 12, wherein shaping the workpiece in the metallic sheath comprises pressing the workpiece in the metallic sheath against a non-conductive tooling surface.

15. The method of claim 14, wherein the non-conductive tooling surface comprises inward-facing surfaces of two mating ceramic dies.

16. The method of claim 14, wherein the non-conductive tooling surface is a ceramic die surface within a pressure chamber.

17. The method of claim 14, wherein the non-conductive tooling surface is a plurality of non-conductive tooling surfaces each on one of a plurality of reconfigurable shafts, wherein the plurality of reconfigurable shafts are each independently actuatable to extend by varying lengths to cooperatively form different shaped contours from the plurality of non-conductive tooling surfaces.

18. The method of claim 12, wherein the metallic sheath comprises sheet metal including one or more of cobalt base alloys, nickel base alloys, heat resistant and corrosion resistant steels, Maraging steels, ultrahigh strength steels, stainless steel, aluminum, titanium alloys, and extreme temperature refractory alloys.

19. The method of claim 12, wherein applying the metallic sheath further comprises fully enclosing the workpiece in the metallic sheath and evacuating atmosphere through an opening of the metallic sheath, and the method further comprises sealing the opening of the metallic sheath during or following said evacuating, as well as cutting open and removing the metallic sheath from the complex-shaped composite part after cooling.

* * * * *